May 24, 1927.

F. LENHARDT

RESILIENT WHEEL

Filed Aug. 19, 1922

Witnesses:
Friedrich Berg
A. Bachmann

Inventor:
Fritz Lenhardt

May 24, 1927. 1,629,715
F. LENHARDT
RESILIENT WHEEL
Filed Aug. 19, 1922 2 Sheets-Sheet 2

Witnesses,
Friedrich Berg
A. Bachmann

Inventor:
Fritz Lenhardt

Patented May 24, 1927.

1,629,715

UNITED STATES PATENT OFFICE.

FRITZ LENHARDT, OF MANNHEIM-ON-THE-RHINE, GERMANY.

RESILIENT WHEEL.

Application filed August 19, 1922, Serial No. 582,916, and in Germany August 19, 1921.

This invention has reference to improvements in resilient wheels having a rigid outer rim connected by india rubber pieces with an inner concentric rim.

One object of my invention is to provide a wheel of this character having the india rubber pieces attached to the corresponding rims of the wheel in a peculiar manner, thus imparting to the rubber pieces a high duration of life and preventing them from becoming injured where they join to the proper wheel parts.

Another object of my invention is to provide joining or fastening members for the rubber pieces for operatively holding fast the latter and for conveniently attaching them to the corresponding rims.

A further object of my invention is to provide a wheel of this character having an improved construction and arrangement of rubber pieces for preventing the inner rim from being turned in respect to the outer rim to an unreasonable degree.

With these and other objects in view my invention consists of certain novel features of construction and the combination and arrangement of parts as will be more fully described and claimed.

Figure 1:
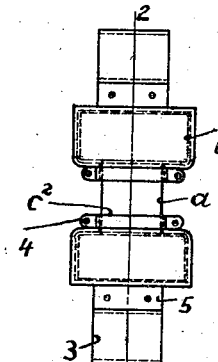
Figure 2:
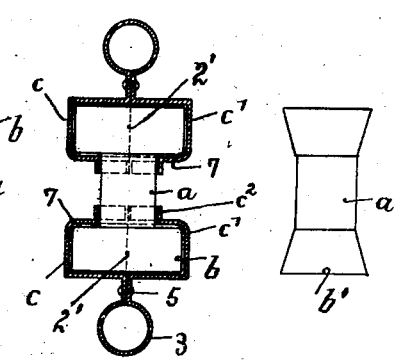
Figure 3:
Figure 3:
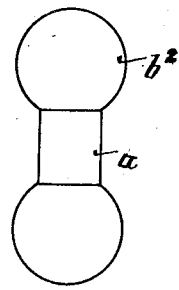
Figure 3:
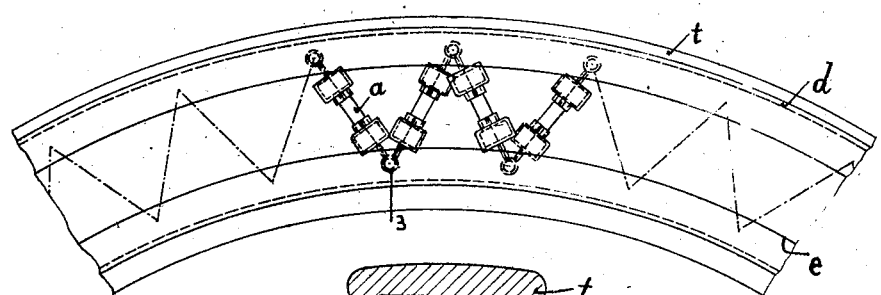
Figure 4:
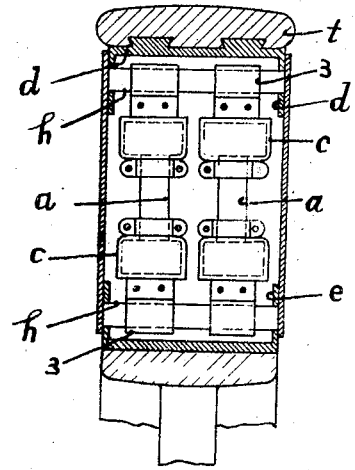
Figure 6:
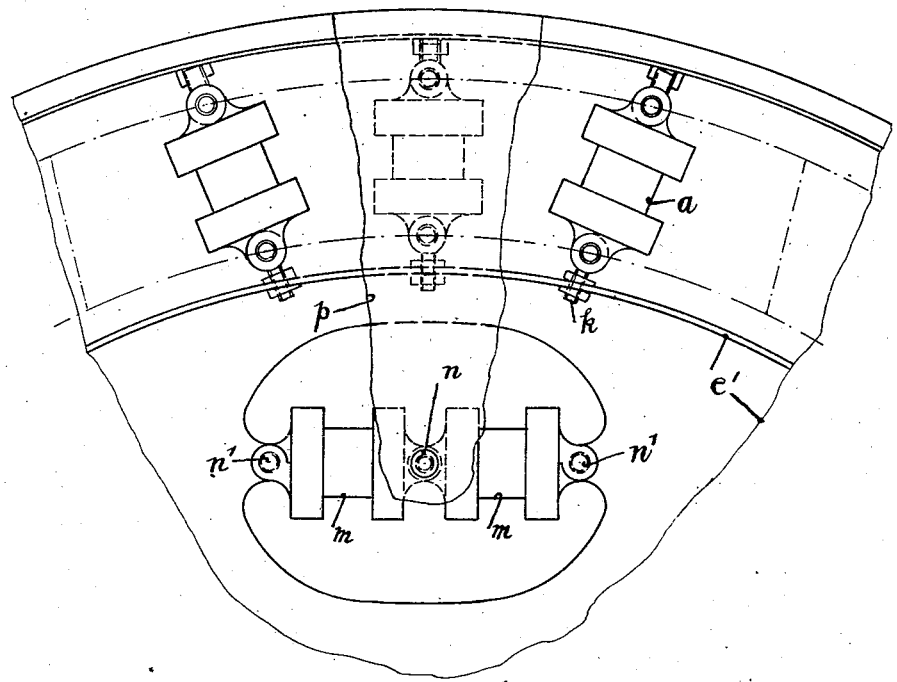
Figure 7:
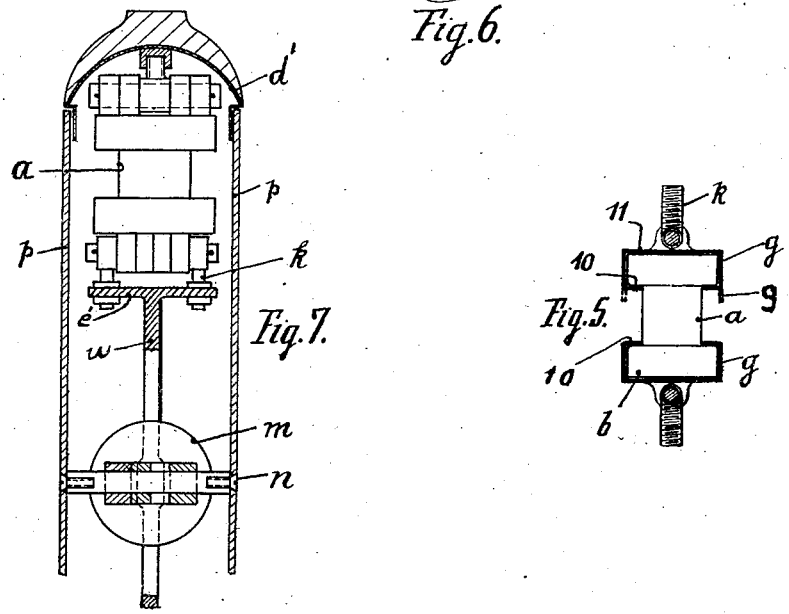
Figure 5:
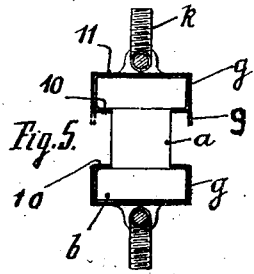

In the accompanying drawings:

Figure 1 is an elevation of one of my improved rubber pieces with holding members, on a natural scale, Figure 2 is a longitudinal section on line 2—2 of Figure 1, the Figures 1ª and 1ᵇ show other forms of rubber pieces alone, Figure 3 is a fragmentary side view of my improved resilient wheel, Figure 4 is a cross section of the outer and inner rim on a larger scale, Figure 5 is a view showing another improved form of the holding members in cross section, particularly useful for bicycles and motor cycles, and Figures 6 and 7 show in a side view and cross-section respectively tangentially arranged rubber pieces.

$a$ designates the rubber pieces having a circular or other convenient cross-section and having according to my invention enlarged parts or heads $b$; the holding members are two-part hollow bodies $c\ c^1$ of a shape corresponding to that of the heads $b$; 2 designates the separating line of these parts. Joined together are the parts $c\ c^1$ by the legs 5 and the eye 3; the legs 5 may be riveted together or otherwise fastened to each other. The volume of the hollow body $c\ c^1$ is so chosen, that the head $b$ is firmly enclosed and held under pressure, thus ensuring a positive seating of the head $b$ against the shoulder 7 of the hollow body $c\ c^1$. Half-cylindrical extensions $c^2$ may be arranged at the hollow parts $c\ c^1$ and provided with ears 4 for improving the firm seating of the rubber head $b$ within its hollow fastening member. Instead of cylindrical shaped, the head may be made conical as in Figure 1ª or spherical as in Figure 1ᵇ or otherwise, the conical head is designated with $b^1$ and the spherical one with $b^2$.

The outer and inner rims are formed by iron channel members $d$ and $e$ respectively, the former carries a solid rubber tire $t$, and each rim is provided with bolts $h$, upon which the eyes 3 are put transversely as shown in Figure 3, as is well-known.

The rubber pieces become in effect, due to their construction and their novel combination with the holding members, rubber spokes which can be easily and firmly joined to their corresponding rims without these spokes being subjected to detrimental forces when they are put under high tension by the weight of the vehicle and the shocks when driving. Exhaustive tests have proved this statement correct.

In the modification according to Figure 5 the holding member consists of a single cap $g$ formed conveniently of thin sheet metal. For the connection of the head $b$ with the cap $g$ the former is put into the cap under pressure while the edge 9 of the cap is straight, then the straight edge 9 is bent inwardly as to form the shoulder 10; threaded bolts $k$ pivotally connected to the caps serve to secure the caps by means of nipples or the like to the corresponding rims of a convenient shape; 11 is a hole to allow the air to escape when the head is put in.

To neutralize the high torsional forces between the outer and inner rims when the vehicle is starting or suddenly stopping, and to save the rubber spokes from excessive strains there are provided special elastic members tangentially arranged and having one end of each fixed by bolts $n$ to the annular discs $p$, fastened to the outer rim $d'$ and simultaneously supporting the two rims $d'$ and $e^1$ against lateral or axial forces, and their other ends by bolts $n^1$ to the central web $w$ on the inner rim $e^1$, I am aware that it is a known expedient to use rubber pieces for an elastic wheel which have thickened parts at the end and support the same by means of holding members. The supporting by these members does however not act all-round the thickened part but only on two opposite sides so that the other sides standing perpendicular to the supported sides are unsupported, wherefrom results an unequal and detrimental stress which causes after a short time the breaking of the rubber skin and consequently a destruction of the rubber piece at the thickened part.

What I claim is:

1. In a resilient wheel having a rigid outer and inner rim, rubber spokes joining the said rims and comprising rubber tensional pieces having enlarged heads, hollow bodies as holding members, enclosing, all around, the said heads under pressure and means for fastening the holding members to their corresponding rims.

2. In a resilient wheel with a rigid outer and inner rim, rubber spokes comprising rubber tensional pieces having enlarged heads, holding members which enclose the said heads under pressure and have their free edges bent inwardly after the corresponding head is inserted, and means for the junction of the said holding members to the corresponding rims.

3. In a resilient wheel with a rigid outer and inner rim, rubber spokes comprising rubber tensional pieces having enlarged heads, holding members which enclose the said heads under pressure and have their free edges bent inwardly after the corresponding head is inserted, apertures arranged on the said holding members for the escape of the air and screw bolts fixed to said holding members and joining the holding members to the corresponding rims.

4. In a resilient wheel in combination with a rigid outer and inner rim, lateral supporting members, attached to the outer rim and rubber spokes with enlarged heads and holding members, means for securing the said holding members to the inner and outer rims, elastic members for neutralizing the torsional forces, each fixed at its one end to the lateral supporting members and at its other end to the inner rim portion of the wheel, and means for joining the said elastic members to their corresponding parts within the wheel.

In testimony whereof I affix my signature.

FRITZ LENHARDT.